United States Patent [19]

Goetz

[11] Patent Number: 4,852,520
[45] Date of Patent: Aug. 1, 1989

[54] PORTABLE PET CARRIER

[75] Inventor: Charles R. Goetz, Carnegie, Pa.

[73] Assignee: Alco Industries, Inc., Valley Forge, Pa.

[21] Appl. No.: 120,872

[22] Filed: Nov. 16, 1987

[51] Int. Cl.⁴ .................................................. A01K 1/02
[52] U.S. Cl. ........................................................ 119/19
[58] Field of Search ..................... 119/17, 19; 190/39; 229/6 A; 220/4 B, 4 E, 4 F; 280/37

[56] References Cited

U.S. PATENT DOCUMENTS

| | | | |
|---|---|---|---|
| 2,439,660 | 4/1948 | Keil | 280/37 |
| 2,790,414 | 2/1956 | Rossow | 119/19 |
| 3,710,761 | 1/1973 | Gregory | 119/19 |
| 3,771,686 | 11/1973 | Brison | 119/19 X |
| 4,484,540 | 11/1984 | Yamamoto | 119/19 |
| 4,522,288 | 6/1985 | Wickman et al. | 190/115 X |
| 4,567,526 | 12/1985 | Winter et al. | 190/39 X |

OTHER PUBLICATIONS

Doskocil Mfg. Co., Inc., "All-New Kennel Cab II", double-sided page.
Doskocil Mfg. Co., Inc., "Kennel Cab II", one page.
Fred Meyer, "Doskocil Kennel Cab", page 2 of 4 page flier, 5/6–6/2/87.
"Pet Taxi", p. 52.
Pet Voyageur, "The Easy Travel Carrier", one page.
Rolf C. Hagen (U.S.A.) Corp., "Pet Voyageur", 4 page brochure.

*Primary Examiner*—Robert P. Swiatek
*Attorney, Agent, or Firm*—Webb, Burden, Ziesenheim & Webb

[57] ABSTRACT

A portable pet carrier having a lower section and a removable upper section attached thereto. The lower section has a bottom wall, spaced side walls, a rear wall and a front wall with an access opening, and the upper section has a top wall, spaced side walls, a rear wall and a front wall with an access opening. The upper section and the lower section are attached by clips which extend through aligned openings in horizontal lips extending outwardly from the edges of the walls of both sections. A gate is pivotally mounted in the access openings in the front walls of the upper section and the lower section, and a latch is located on the gate for retaining the gate in the closed position. A plurality of rollers are carried on the exterior of the bottom wall of the lower section, and lifting and towing handles are pivotally attached to the exterior of the top wall of the upper section for moving the portable pet carrier.

9 Claims, 2 Drawing Sheets

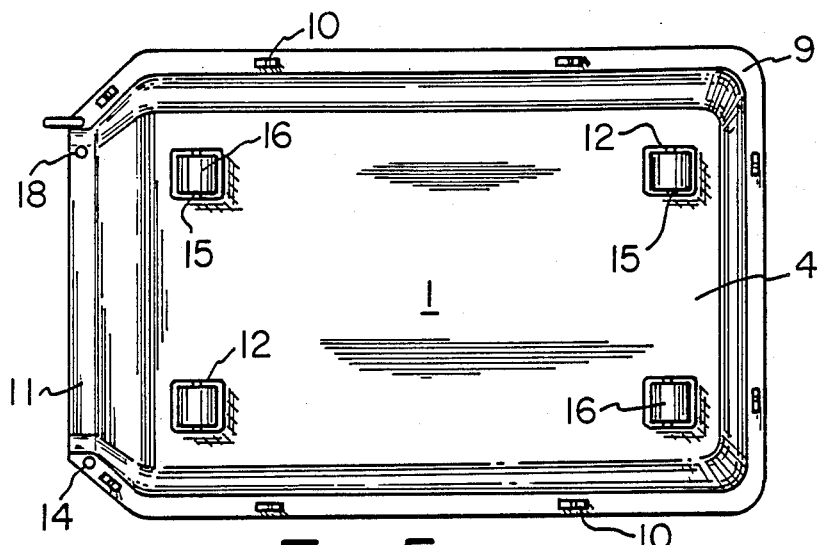
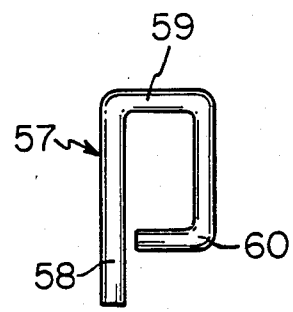
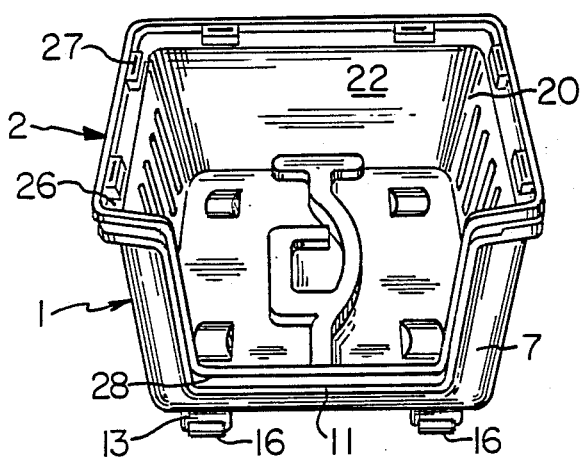
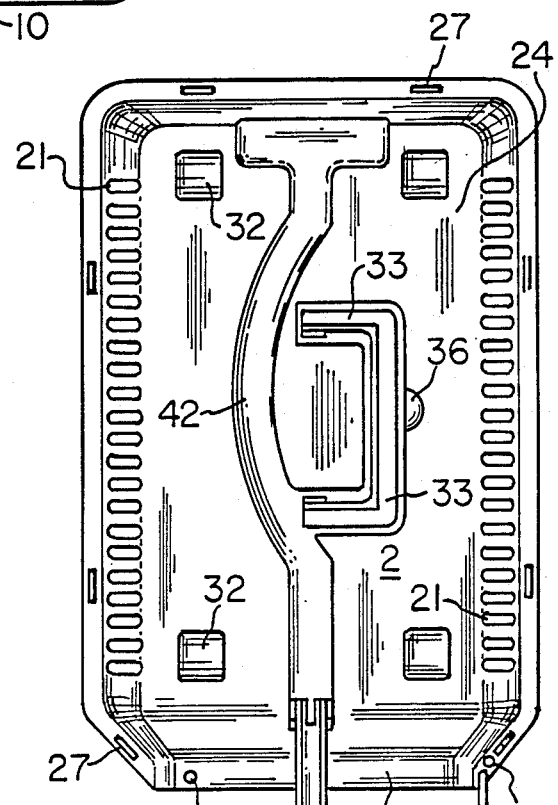
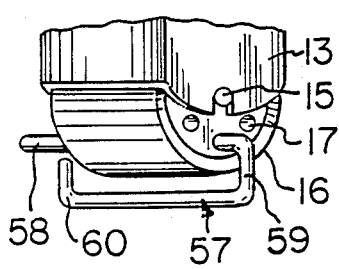
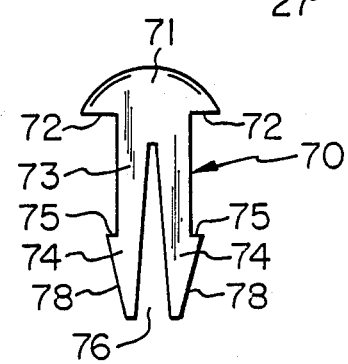

PORTABLE PET CARRIER

BACKGROUND OF THE INVENTION

1. Field of the Invention

The invention relates generally to a portable pet carrier having two sections which may be disassembled for storage and assembled into a unit for transporting a pet. More particularly, the portable pet carrier has a lower section which has wheels on its lower surface and an upper section attached to the lower section with an elongated tow handle on the top of the upper section so that the carrier may be easily moved with a large pet therein without having to carry the pet and the carrier.

2. Description of the Prior Art

The prior art pet carriers have an upper half and a lower half and are made partly from a synthetic material but generally have a metal door and other metal parts. Additionally, the upper and lower halves of prior art pet carriers are held together with screw connectors or clips which require a screwdriver, a wrench or other tool for assembly and disassembly. The prior art carriers must be lifted and carried by the user to move the pet from place to place such as into an airport or an automobile.

SUMMARY OF THE INVENTION

The invention is a portable pet carrier having separable upper and lower sections which are molded from a synthetic plastic material. When the two sections are assembled, they are held together by compression snap-lock pins which fit through complementary openings in horizontal lips on the upper section and the lower section. All parts of the pet carrier are molded from a synthetic plastic material such as a high density polyethylene or copolymer polypropylene. The pet carrier has a pivoted lifting handle attached to the top wall of the upper section for lifting the carrier and an elongated pivoted tow handle attached to the top wall of the upper section for pulling the carrier. Each of the handles can be folded into a recess in the top wall of the upper half when the pet carrier is not in use. Wheels are provided on the bottom wall of the lower section so that the carrier and a pet contained therein can be towed by the user thereby eliminating the necessity of carrying the carrier at all times to move a pet. The wheels are located in recesses in the bottom wall of the lower section, and the top wall of the upper section is formed with spaced recesses corresponding in position to the wheels to receive the wheels when a number of pet carriers are stacked for display or storage. Each wheel is provided with a plurality of elongated passages parallel to the axle which receives a specially shaped locking pin to prevent rotation of the wheels and consequent movement of the pet carrier while it is at rest. The upper and lower sections of the pet carrier are sized so that they can be nested for storage purposes when the upper section is inverted. The access door or gate in the front of the pet carrier is removable when the upper and lower sections are disassembled, and a specially shaped locking pin is provided to retain the gate in the closed position. The compression snap-lock pins which hold the upper and lower sections together may be quickly and easily assembled and disassembled without the use of any tools.

BRIEF DESCRIPTION OF THE DRAWINGS

FIG. 5 is a plan view of the lower section of the pet carrier;

FIG. 6 is a plan view of the upper section of the pet carrier with the tow handle extended;

FIG. 7 is a perspective view of the pet carrier with the upper and lower sections nested in the storage condition;

FIG. 8 is an elevation of the locking pin for latching the gate and locking the wheels;

FIG. 9 is an elevation of an attachment pin for connecting the upper and lower sections of the pet carrier; and FIG. 10 is a perspective view of a wheel with a locking pin in place.

DESCRIPTION OF THE PREFERRED EMBODIMENT

Figure 1:
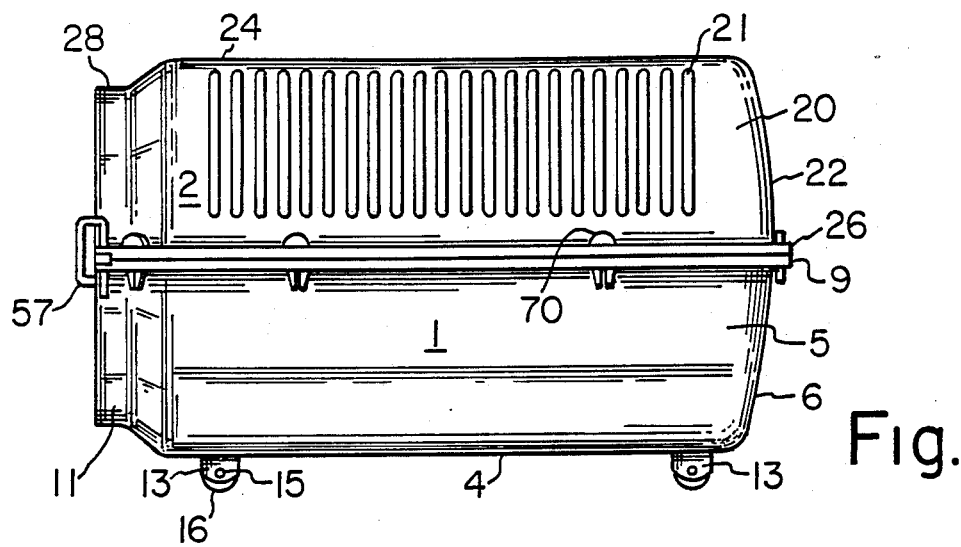
FIG. 1 is a side elevation of the pet carrier in the assembled condition.

With reference to the drawings, it will be seen that the pet carrier in its assembled condition comprises a lower section 1 and an upper section 2. The lower section has a bottom wall 4, spaced side walls 5, a rear wall 6 and a front wall 7 having an opening 8. A horizontal lip or flange 9 extends outwardly from the periphery of the upper edges of walls 5, 6 and 7. The lip 9 is provided with a plurality of spaced rectangular slots 10 for a purpose set forth hereinafter. As best shown in FIG. 5 of the drawings, the bottom wall 4 of the lower section is provided with four spaced openings 12, each of which has a downwardly projecting collar 13 around its periphery. The openings 12 are located proximate the four corners of the bottom wall 4 of the lower section 1. The opposed side walls of each collar 13 are provided with aligned openings which receive an end of an axle 15 on which a wheel or roller 16 is mounted. Each wheel is provided with a plurality of elongated passages 17 parallel to the axle for a purpose to be described hereinafter. A lip 11 extends outwardly from front wall 7 around the edge of the opening 8 and a hole 18 is located adjacent to one corner of the bottom portion of the lip 11. A hole 14 is formed in a forward corner of the lip 9 as shown in FIG. 5 of the drawings.

Figure 2:
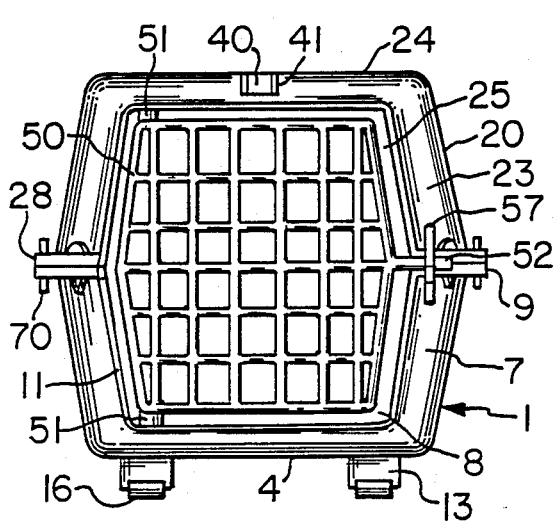
FIG. 2 is a front elevation of the pet carrier in the assembled condition.
Figure 3:
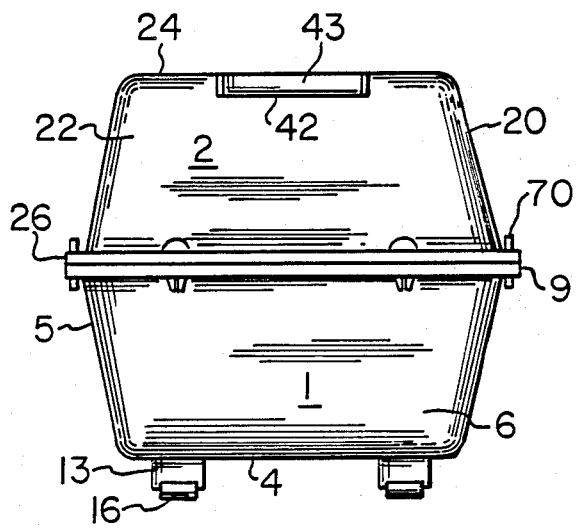
FIG. 3 is a rear elevation of the pet carrier in the assembled condition.
Figure 4:
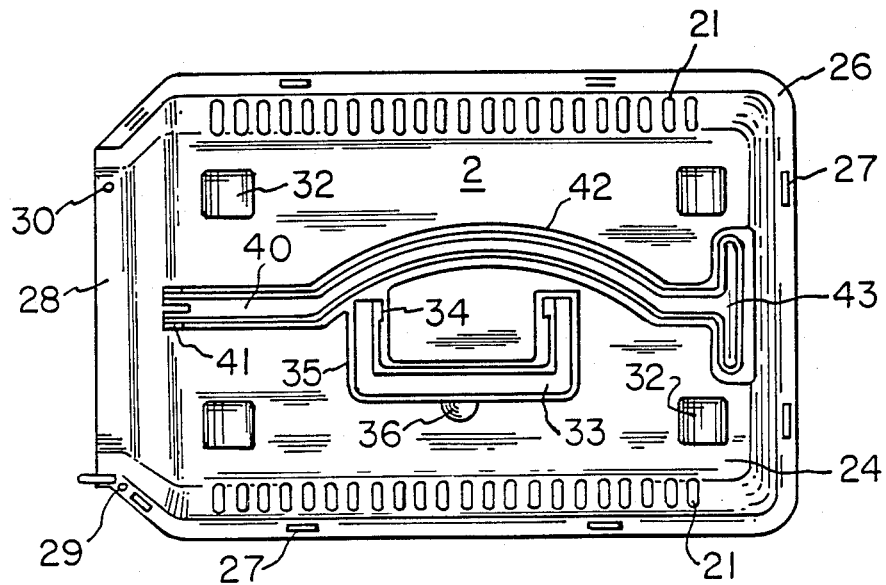
FIG. 4 is a plan view of the upper section of the pet carrier with the handles in the lowered position.

The upper section 2 of the pet carrier has spaced side walls 20 formed with a plurality of elongated spaced air vent slots 21, a rear wall 22, a front wall 23 and a top wall 24. The front wall has an opening 25 formed therein. A horizontal lip or flange 26 extends outwardly from the periphery of the upper edges of walls 20, 22 and 23. The lip 26 is provided with a plurality of spaced rectangular slots 27 which are complementary with the rectangular slots 10 formed in the horizontal lip 9 on the lower section so that slots 10 and 27 are aligned when the upper and lower sections are assembled as shown in FIGS. 1–3 of the drawings A lip 28 extends outwardly from the front wall 23 surrounding the opening 25 in the front wall. The bottom of the lip 28 has a hole 30 located in a corner which is aligned with the hole 18 in the lip 11 surrounding the opening 8 in the lower section so that the holes 18 and 30 are aligned when the upper and lower sections are assembled. Additionally, a hole 29 is formed in a forward corner of the lip 26 on the upper section and is complementary with the hole 14 formed in the lip 9 on the lower section so that the holes 14 and 29 are aligned when the upper and lower sections are assembled.

The top wall 24 of the upper section 2 of the pet carrier has four downwardly extending cup-like closed recesses 32 located in the same position as the wheels 16 carried by the bottom wall 4 of the lower section 1 so that assembled carriers can be stacked with the wheels 16 located in the downwardly extending recesses 32 in the top wall 24 of the upper section. A lifting handle 33 is pivotally attached to the top wall 24 of the upper section by a pivot 34 extending parallel to the longitudinal axis of the upper section. When the handle 33 is in the lowered position, it lies in a recess 35 formed in the upper surface of the top wall 4 of the upper section so that the plane of the top wall 24 is uninterrupted when the handle is in the lowered position. A rounded finger notch 36 is provided as a part of recess 35 so that the handle 33 can be easily pivoted into the lifting position.

An elongated tow handle 40 is pivoted to the exterior of the top wall 24 of upper section 2 by an included pivot 41 which fits into opposed openings in the spaced side walls of a recess 42 formed in the upper surface of the top wall 24 of the upper section 2. The tow handle 40 has a hand grip 43 at the end opposite the end pivoted to the top wall of the upper section for the user to pull the pet carrier on the wheels 16. The recess 42 has a curved section which extends around the recess 33 and is continuous with the recess 33 to facilitate the molding of the upper section. When the tow handle 40 is in the lowered position, it lies in the recess 42 so that the plane of the top wall 24 of the upper section 2 is uninterrupted.

When the upper and lower sections are assembled, the rectangular slots 27 and 10 are aligned; the hole 18 is aligned with the hole 30 and the hole 14 is aligned with the hole 29. A gate 50 is located at the front of the carrier in opening 8 in the front wall 7 of the lower section 1 and in opening 25 in the front wall 23 of the upper section 2. A hinge pin 51 is located at the upper and lower corners of gate 50 and fits into the aligned holes 18 and 30 so that the gate can be pivoted between the open position and the closed position shown in FIG. 2 of the drawings. The gate has a laterally extending latch member 52 on the side opposite pivot pins 51. A locking pin 57 to retain the gate in the closed position is shown in FIG. 8 of the drawings. The locking pin 57 has a first elongated closure leg 58, a lateral leg 59 and a right angle portion 60 connected to one end of the leg 59. The closure leg 58 fits through holes 14 and 29 and a hole (not shown) in latch member 52 to retain the gate in the closed position as shown in FIG. 2 of the drawings, and the right angle portion 60 of the latch pin 57 prevents accidental removal of the locking pin. As shown in FIG. 10 of the drawings, a locking pin 57 is also used to prevent rotation of the wheels 16 when the pet carrier is intended to remain in position. To prevent rotation of a wheel 16, the closure leg 58 is inserted through one of the elongated passages 17 in a wheel 16, and the right angle portion 60 prevents accidental removal of the locking pin. More than one locking pin is provided with each pet carrier.

When the upper and lower sections of the pet carrier are assembled, the rectangular slots 10 in the lip 9 of the lower section are aligned with the rectangular slots 27 in the lip 26 of the upper section, and a compression snap clip 70 extends downwardly through each pair of aligned slots to hold the upper and lower sections together. As shown in FIG. 9 of the drawings, each clip 70 has a head 71 which has lower shoulders 72 which contact the upper surface of the lip 26 on the upper section of the pet carrier when the pin is in position. A pair of legs 73 extend downwardly from the head 71, and each leg has a lower end portion 74 formed with an outwardly extending shoulder 75 which contacts the lower surface of the lip 9 on the lower section to firmly attach the upper and lower sections of the pet carrier together when they are assembled. The clip 70 has an inverted V-shaped opening 76 between legs 73 so that the legs can be squeezed together when inserted in rectangular slots 10 and 27 by the contact between the angled outer edges 77 on the lower end portions of the legs 73 and thereby force the lower end portions of the legs together until the clip 70 snaps into the locking position shown in FIGS. 1-3 of the drawings to attach the upper and lower sections together. When it is desired to separate the upper and lower sections of the assembled pet carrier, it is a simple matter for the user to grasp the lower end portions 74 of each leg 73 between a thumb and forefinger and squeeze the legs together until the shoulders 75 clear the edges of the lower rectangular slot 10 and withdraw the clip. After all of the clips have been withdrawn, the lifting handle 33 is pivoted into the raised position to remove the top section 2 from the lower section 1. The gate 50 is then easily removed since at this time it is held only by the lower pivot pin 51 resting in hole 18 in the lip 11 on the front wall 7 of the lower section of the pet carrier. The handle 33 is then pivoted back into the recess 35, and the upper section 2 is inverted and nested into the lower section 1 for storage as shown in FIG. 7 of the drawings.

While eight rectangular slots are shown in the lips on the upper and lower sections, it will be understood by those skilled in the art that the number of rectangular slots is not critical so long as there are a sufficient number of rectangular slots to provide adequate strength between the upper and lower sections to permit the pet carrier to be lifted by the handle 33 when a pet is contained in the carrier.

While a preferred embodiment of the invention has been described herein, it is to be understood that the invention may be embodied within the scope of the appended claims.

I claim:

1. A portable pet carrier having a lower section and a separable upper section; said lower section having a bottom wall, spaced side walls, a rear wall and a front wall having an opening formed therein, said upper section having a top wall, spaced side walls, a rear wall and a front wall having an opening formed therein; said walls of said upper section and said walls of said lower section having free edges; means on said free edges of said walls for attaching said upper section to said lower section; a gate pivotally mounted in the openings formed in the front walls of said upper section and said lower section; latch means on said gate for retaining said gate in the closed position and means on said upper section and on said lower section adapted to receive said latch means on said gate when said gate is in the closed position; a locking pin adapted to extend through said latch means on said gate and through said means on said upper section and said means on said lower section to receive said latch means on said gate to retain said gate in the closed position; said locking pin having a closure leg, a lateral leg connected at one end to an end of said closure leg and a right-angle retaining portion connected to the other end of said lateral leg to prevent the accidental removal of said latch pin from said latch member; roller means on the exterior of said bottom wall of said lower section and handle means on the exterior of said top wall for moving said pet carrier.

2. A portable pet carrier having a lower section and a separable upper section; said lower section having a bottom wall, spaced side walls, a rear wall and a front wall having an opening formed therein, said upper section having a top wall, spaced side walls, a rear wall and a front wall having an opening formed therein; said walls of said upper section and said walls of said lower section having free edges; means on said free edges of said walls for removably attaching said upper section to said lower section; a gate pivotally mounted in the openings formed in the front walls of said upper section and said lower section; latch means on said gate for retaining said gate in the closed position and means on said upper section and on said lower section adapted to receive said latch means on said gate when said gate is in the closed position; roller means on the exterior of said bottom wall of said lower section; a first pivotally mounted lifting handle and a second pivotally mounted towing handle mounted on the exterior of said top wall of said upper section and said exterior of said top wall of said upper section having a first recess for receiving said lifting handle when said lifting handle is in the inoperative position and a second recess for receiving said towing handle when said towing handle is in the inoperative position.

3. A portable pet carrier as set forth in claim 2 wherein said towing handle has a grip portion and a curved central portion located between said grip portion and said pivotal attachment of said towing handle to said top wall of said upper section.

4. A portable pet carrier as set forth in claim 2 wherein said recesses in said top wall are continuous.

5. A portable pet carrier as set forth in claim 2 wherein said means for removably attaching said upper section to said lower section is horizontal peripheral lip extending around the edges of said walls of said lower section and a substantially horizontal peripheral lip extending around said walls of said upper section; each of said peripheral lips having a plurality of openings formed therein which are spaced to be aligned with each other when said peripheral lip on said upper section is placed onto said peripheral lip on said lower section; and a compression snap clip extending through each opening in said peripheral lip on said upper section and the aligned opening in said peripheral lip on said lower section to attach said upper section to said lower section.

6. A portable pet carrier as set forth in claim 5 wherein each of said clips has an upper head portion formed with shoulders adapted to engage the upper surface of said peripheral lip on said upper section, a pair of spaced legs extending downwardly from said head portion and having a lower end portion and an outwardly extending shoulder on each lower end portion adapted to engage the lower surface of said peripheral lip on said lower section when said clip is located in an opening in said peripheral lip on said upper section and an aligned opening in said peripheral lip on said lower section.

7. A portable pet carrier as set forth in claim 2 wherein the outer surface of said top wall of said upper section is formed with a plurality of spaced cup-like recesses, said recesses having the same spacing as said roller means on the exterior of said bottom wall of said lower section, whereby a pet carrier may be stacked on another pet carrier with said roller means being located in said recesses.

8. A portable pet carrier as set forth in claim 2 wherein said roller means is four rollers mounted proximate the corners of said bottom wall of said lower section.

9. A portable pet carrier as set forth in claim 2 wherein said roller means is a plurality of rollers mounted on an axle attached to said bottom wall of said lower section, at least one of said rollers having a plurality of elongated passages parallel with the axle of said roller extending through the roller, whereby a locking pin may be inserted through one of said elongated passages to prevent movement of said one roller when said pet carrier is to remain in position.

* * * * *

UNITED STATES PATENT AND TRADEMARK OFFICE
CERTIFICATE OF CORRECTION

PATENT NO. : 4,852,520

DATED : August 1, 1989

INVENTOR(S) : Charles R. Goetz

It is certified that error appears in the above-identified patent and that said Letters Patent is hereby corrected as shown below:

Claim 5 Line 5 Column 43 after "is" insert --a substantially--.

Signed and Sealed this

Ninth Day of October, 1990

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,852,520

DATED : August 1, 1989

INVENTOR(S) : Charles R. Goetz

It is certified that error appears in the above-identified patent and that said Letters Patent is hereby corrected as shown below:

The Certificate of Correction issued October 9, 1990 is hereby cancelled.

In Claim 5 Column 5 Line 43 after "is" insert --a substantially--.

This certificate supercedes Certificate of Correction issued October 9, 1990.

Signed and Sealed this

Fifteenth Day of December, 1992

*Attest:*

DOUGLAS B. COMER

*Attesting Officer*      *Acting Commissioner of Patents and Trademarks*